US008172412B2

(12) United States Patent
Solyar et al.

(10) Patent No.: US 8,172,412 B2
(45) Date of Patent: May 8, 2012

(54) ADJUSTABLE OPTICAL MOUNT (75) Inventors: Gregory Solyar, Baltimore, MD (US);
Walter Blumenfeld, Airville, PA (US);
Joseph D'Etremont, Phoenix, MD (US)

(73) Assignee: Lenox Laser Corporation, Glen Arm, MD (US)

( * ) Notice: Subject to any disclaimer, the term of this patent is extended or adjusted under 35 U.S.C. 154(b) by 356 days.

(21) Appl. No.: 12/589,889

(22) Filed: Oct. 31, 2009

(65) Prior Publication Data

US 2011/0102893 A1    May 5, 2011

(51) Int. Cl.
*G02B 7/182* (2006.01)
(52) U.S. Cl. ....................................................... 359/872
(58) Field of Classification Search .................. 359/871, 359/872, 896
See application file for complete search history.

(56) References Cited

U.S. PATENT DOCUMENTS

| 6,519,101 | B2 * | 2/2003 | Bell et al. ................. 359/872 |
| 6,539,046 | B2 | 3/2003 | Newman et al. |
| 6,750,972 | B2 | 6/2004 | Sandstrom et al. |
| 6,873,418 | B1 | 3/2005 | Howey et al. |
| 7,400,802 | B2 | 7/2008 | Wyatt et al. |
| 2005/0168826 | A1 | 8/2005 | Koulikov et al. |

* cited by examiner

*Primary Examiner* — Euncha Cherry
(74) *Attorney, Agent, or Firm* — John C. Shepard (57) ABSTRACT An adjustable optical mount adapted for use with an optical table defining a reference plane includes a hollow housing with openings in the side walls to allow passage of an optical beam therethrough, a gimbal base fixed on the top of the housing, a gimbal plate adjustably mounted under the gimbal base, and a carrier bracket fixed to the gimbal plate for holding preselected optical elements within the housing along the path of the beam. Adjustment mechanisms are provided to tilt and rotate the gimbal plate so as to align the optical element on a selected axis relative to the reference plane.

43 Claims, 6 Drawing Sheets

ADJUSTABLE OPTICAL MOUNT

STATEMENT REGARDING FEDERALLY SPONSORED RESEARCH OR DEVELOPMENT

The U.S. Government has a paid-up license in the present invention and the right in limited circumstances to require the patent owner to license others on terms as provided for by the terms of Grants #1R43NS049714-01, #9R44MH080693-02 and #5R44MH080693-03 awarded by the U.S. National Institutes of Health.

BACKGROUND OF THE INVENTION

1. Technical Field

The present invention pertains to an optical mount and, more particularly, to an optical mount used with a supporting optical table that may be adjusted to position optical elements at selected angles relative to the table.

2. Background Art

Optical tables, benches, breadboards, rails, workstations and the like (herein all collectively referred to simply as tables or supporting structures) are often used for laser and other optical experiments and engineering prototypes. For example, a typical optical table has a flat upper surface with a series of ¼"-20 (M6) threaded holes arranged in a rectangular array or grid spaced 1" or 2" (25 mm or 50 mm) apart. To the table surface, various components, devices and mounts are selectively arranged and fixed to construct an optical system. They are attached to the table as by bolts, screws and the like, until they are removed. The flat upper surface of the table generally defines the position of a reference plane to which the optical elements are aligned.

Construction of such optical systems requires mechanisms for positioning, retaining and aligning optical elements, such as mirrors, beam splitters, filters apertures, and lenses. Integrated mounting hardware optimized for specific applications requires engineering design, assembly and testing cycles that may be prohibitively expensive and time consuming for all but the highest value applications. Off-the-shelf general purpose mounts are readily available, but they are generally not stable and repeatable in an environment of thermal cycling and vibration. Their use frequently results in overly large, cumbersome systems that are unsuited for anything but short-term laboratory feasibility studies in benign environments. In industrial applications, it is also very desirable to seal optical systems against airborne dust, debris and chemical contamination. Most general purpose mounts are not amenable to such protection.

BRIEF SUMMARY OF THE INVENTION

The present invention is directed to overcoming one or more of the problems as set forth above.

It is an object of the present invention to provide an optical mount that is compatible with standard optical elements that may have a range of thicknesses, sizes and shapes.

It is a further object of the present invention to provide an optical mount enabling adjustment and repositioning of optical elements held therein after the mount has been fixed to the supporting structure.

It is also an object of the present invention to provide an optical mount that incorporates two orthogonal-axis rotational alignment adjustments allowing a user to tilt or adjust the angle of an optical element mounted therein relative to a selected reference plane.

It is another object of the present invention to provide an optical mount that has an alignment adjustment allowing a user to rotate an optical element mounted therein relative to a selected axis.

It is a feature of the present invention to provide a modular assembly for mounting optical system components having multiple axis precision alignment adjustments, and incorporating retention brackets compatible with standard optical elements of varying thickness.

It is a further feature of the present invention to provide a device usable in the rapid, economical construction of an optical breadboard or of a prototype instrumentation and system, and is adaptable for use with fluidic or vacuum applications, microscopy, micromachining systems, and laser technology.

Numerous other advantages and features of the present invention will become readily apparent from the following detailed description of the invention and the embodiments thereof, from the claims and from the accompanying drawings.

BRIEF DESCRIPTION OF THE SEVERAL VIEWS OF THE DRAWINGS

The details of construction and operation of the invention are more fully described with reference to the accompanying drawings which form a part hereof and in which like reference numerals refer to like parts throughout.

In the drawings.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE PREFERRED EMBODIMENTS

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 1:
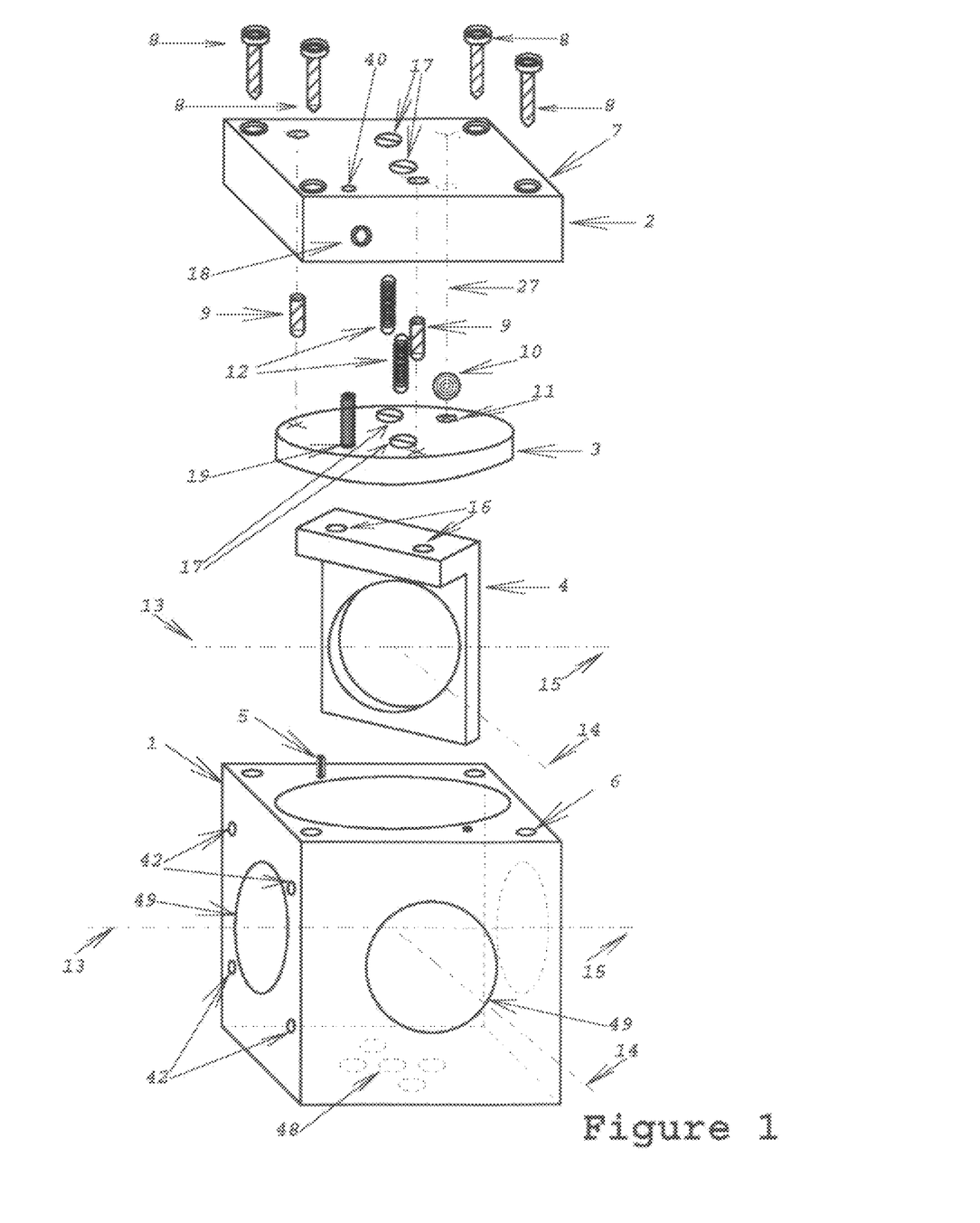
FIG. 1 is an exploded isometric view of an optical mount constructed in accordance with the present invention.
Figure 2:
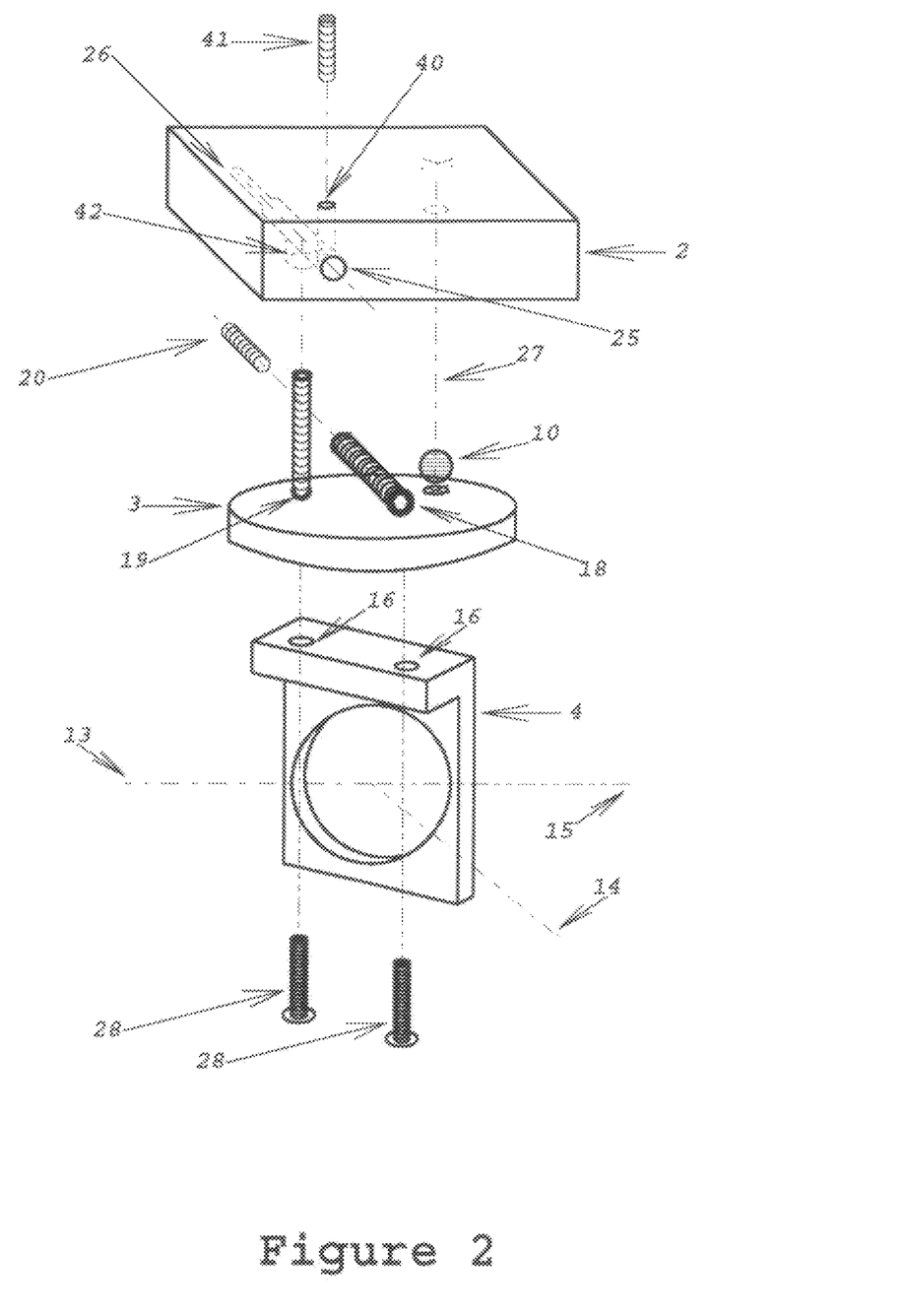
FIG. 2 is an exploded isometric view of the top and internal parts of the optical mount shown in FIG. 1.
Figure 3:
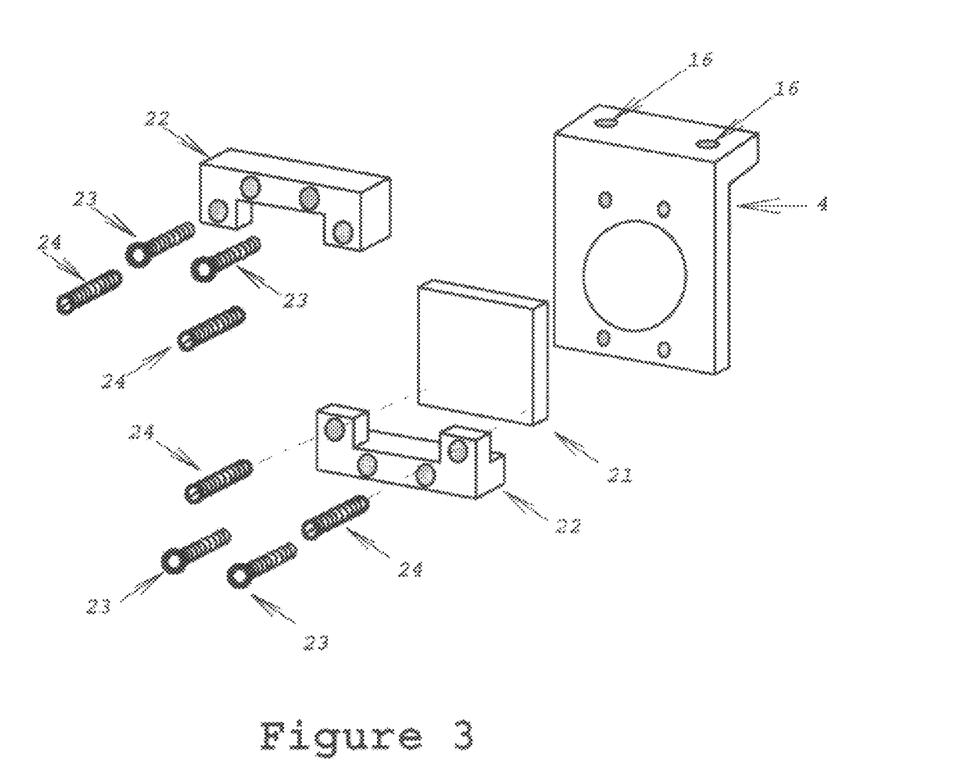
FIG. 3 is an exploded view of the opposite side of the carrier bracket shown in FIGS. 1 and 2.

Referring to the drawings in greater detail, a mount for an optical element 21 acting upon a beam is shown in FIGS. 1 through 3. The mount is adapted for use with a table or other supporting structure (not shown) as described above generally defining a reference plane along which an optical beam will travel.

The principal components of the optical mount are a hollow body or housing 1, a gimbal base 2 mounted on top of the housing 1, a gimbal plate 3 mounted under the gimbal base 2, and an optics carrier bracket 4 fixed to the underside of the gimbal plate 3 for holding a preselected optical element 21. It should be understood that the parts are most expediently assembled while the gimbal base 2 is removed from the housing 1 and that when the gimbaled parts are fixed together, the gimbal base 2 is mounted to the top of the housing 1 to form a part of the top thereof.

The optical mount is made up of a hollow housing 1, such as a cube or box, adapted to be fixed to the supporting structure by means of releasable fasteners inserted through openings 48 (shown in phantom) formed in the horizontal bottom wall of the housing 1 and fixedly attached to the supporting structure. The housing 1 has a horizontal top wall and four flat side walls extending vertically between the top and bottom walls. Defined in the side walls are circular ports or openings 49 permitting an optical beam to pass through the walls of the housing 1. A first side opening is oriented along the axis 13 of an incoming incident beam. A second side opening in the side wall opposite the first side opening is oriented along the axis 15 of a possible outgoing transmission beam going straight through the housing 1. A third side opening is oriented 90° from the first and second side openings along the axis 14 of a possible outgoing reflected beam. The openings 49 may be sealed by mounting a suitable cover component 50 as shown in FIG. 5(b) over the beam openings by the use of screw fasteners extending into the tapped holes 42 surrounding the beam openings.

The gimbal base 2 is positioned on top of the housing 1 over the top wall opening and aligned by means of registration pins 5 (one of which is shown) extending from the housing 1 and mating with cooperating holes (not shown) defined in the undersurface of the gimbal base 2. The gimbal base 2 is fixedly retained in place by four fastening retention screws 8 inserted through clearance through-holes 7 in the gimbal base 2 and threaded into respective aligned threaded bores 6 in the housing 1. The gimbal base 2 is thus located in spaced relation from the bottom wall and said supporting surface at a height above the reference plane.

The top wall of the housing 1 has an oversized opening defined therein through which the gimbal plate 3 can be positioned within the housing 1. The gimbal plate 3 is secured to the gimbal base 2 by a pair of retention springs 12 extending through clearance holes defined in the gimbal base 2 and the gimbal plate 3. The retention springs 12 are held in place by spring pins 17 at each of their respective ends and are a source of force acting to urge the gimbal base 2 and the gimbal plate 3 toward one another.

The gimbal base 2 and gimbal plate 3 are held in vertically-spaced apart relation against spring force by a pair of spaced alignment setscrews 9 and a pivot ball 10. The setscrews 9 are retained by and extend downward through threaded bores in the gimbal base 2 and have distal ends contacting the upper surface of the gimbal plate 3 to establish two points of support. A third fixed point of support and spacing is provided by the pivot ball 10 disposed between the gimbal base 2 and gimbal plate 3 and horizontally spaced from the setscrews 9. The pivot ball 10 rides in opposed shallow concave depressions, or pivot ball axis sockets 11, one defined in the upper surface of the gimbal plate 3 and the other in the lower surface of the gimbal base 2. The resultant force of the retention springs 12 holds the gimbal plate 3 against the pivot ball 10 and the distal ends of the setscrews 9.

The function of the alignment setscrews 9 is to provide continuous adjustment of the tilt plane of the gimbal plate 3 relative to the housing 1, which in turn allows an optical element to be moved to a position perpendicular to the reference plane. By turning either of the setscrews 9 from their externally accessible proximal end, the length of the setscrew 9 between the gimbal base 2 and the gimbal plate 3 may be adjusted to lengthen or shorten the distance at that point and tilt the gimbal plate 3 about the surface of the pivot ball 10.

By selectively adjusting the first setscrew 9, the gimbal plate 3 is rotated about a first axis extending generally from the distal end of the second setscrew 9 to the bottom of the pivot ball 10. By selectively adjusting the second setscrew 9, the gimbal plate 3 is rotated about a second axis transverse to the first axis and extending generally from the distal end of the first setscrew to the bottom of the pivot ball 10. The pivot plate 3 is thereby rocked or tilted relative to the pivot base 2. With this construction, the axis of rotation of the gimbal plate 3 around the pivot ball 10 is constrained to be perpendicular to the reference plane. Since there are two adjustment points, the tilt of gimbal plate 3 may be adjusted to make the optical element perpendicular to the optical table. By using the setscrews 9, the angle of the gimbal plate 3 provides for continuous angular adjustment orthogonal to the reference mounting plane such that the reflection or transmission axis of an incident beam of light from the optical element 21 may be readily aligned to be coplanar with the reference mounting plane.

To provide continuous adjustment of the gimbal plate 3 about an axis 27 generally orthogonal to the reference plane, a second function of the pivot ball 10 is to act as the pivot for relative horizontal rotational movement between the gimbal base 2 and the gimbal plate 3. Referring to FIG. 2, an upright phase angle pin 19 is attached to the top of the gimbal plate 3. A phase angle alignment setscrew 18 is selectively screwed into a threaded bore 25 from the front side of the gimbal base 2 so that its distal end contacts the upright phase angle pin 19. To hold the phase angle pin 19 resiliently against the end of the setscrew 18, a spring plunger 20 is located in a blind smooth bore 26 that is collinear with the threaded bore 25 in the gimbal base 2. The phase angle pin 19 extends into a clearance hole 42 defined in the undersurface of the gimbal base 2. The hole 42 has a diameter larger than the contact pin 19 so that there may be relative movement therebetween. The axis of the hole 42 is perpendicular to and intersects the collinear axes of the threaded bore 25 and the smooth bore 26. The phase angle alignment screw 18 is immobilized by a phase angle locking setscrew 41 that is retained within a threaded locking setscrew hole 40.

To effect clockwise or counterclockwise rotation of the gimbal plate 3 by external manipulation about a vertical axis extending through the pivot ball 10, the proximal end of the phase angle alignment screw 18 is selectively extended into the angle pin 19 to compress the spring plunger 20 or retracted from the angle pin 19 to uncompress the spring plunger 20 thereby rotating the gimbal plate 3. Note that the large opening at the top of the housing 1 is oversized relative to the gimbal plate 3 to permit angular and rotational movement of the gimbal plate 3 relative thereto without binding.

Continuous variable rotational adjustment by operation of the setscrew 18 in this fashion permits rotation of the exit beam axis in the reference mounting plane independently of angular adjustment thereby permitting the beam to be rotated within the reference plane without readjustment of its tilt angle.

To mount an optical element 21 to the gimbal plate 3 in the path of the optical beam passing through the housing 1, a carrier bracket 4 is provided that is positioned below and fixed to the gimbal plate 3. The carrier bracket 4 has a mounting leg extending perpendicularly outward from its front surface that is attached to the gimbal plate 3 by bracket-mount screws 28 extending through spaced clearance through-holes 16 and screwed into respective aligned threaded holes defined in the bottom surface of the gimbal plate 3. The carrier bracket 4 also has a depending leg extending generally downward into the interior of the housing 1 to intersect the path of an optical beam. An opening is defined in the depending leg to permit the beam to pass therethrough.

On the depending leg of the carrier bracket 4 on either side of the beam opening, a pair of vertically-spaced clamps 22 are fixed by clamp-mount screws 23 extending through spaced clearance through-holes and turned into respective aligned threaded holes defined in the rear surface of the carrier bracket 4. Extending from each of the retention clamps 22 generally toward the opening, but outwardly thereof, and spaced from the carrier bracket 4 are a pair of horizontally-spaced projections. A preselected optical element 21 is placed vertically between the pair of clamps 22 in the space defined between the projections and the carrier bracket 4 across the bracket opening in the intended path of the optical beam.

To hold the optical element 21 therein, ball spring plungers 24 extend from threaded holes in each of the clamp legs to press the optical element 21 against the carrier bracket 4. The varying thickness of the optical element 21 is accommodated by adjusting the depth of the ball spring plungers 24 in their threaded holes. Thermal expansion is accommodated by the spring travel of the ball spring plungers 24. It should be noted that retention of the optical element within the bracket 4 can be accomplished by other means as well including clips and other clamps and clamp mechanisms. Preferably, the clamps provide for adjustable clearance and contact force.

The carrier bracket 4 is constructed in such a way that the front surface of an optical element 21 mounted to the rear of the carrier bracket 4 is aligned to fall on the vertical center axis of the housing 1. Because the front surface of the optical element 21 is pressed against the rear of the carrier bracket 4, the optical element 21 should always be aligned with the vertical center axis of the housing 1.

The pivot ball 10, the pivot ball axis, and the two alignment setscrew axes are positioned such that an optical input beam coincident with the optical input axis and meeting the front surface of an optical element 21, such as a mirror fixed to the carrier bracket 4, is reflected to the reflected output axis with the property that the optical output beam deflections produced by the two alignment setscrews 9 are independent and orthogonal.

A variety of optical elements 21 may be fixed to the bracket by the clamps 22. For example, one might mount mirrors such as an alignment mirror, beam splitters such as a dichroic beam splitter, apertures, masks, lenses, filters, polarizers, detectors, light sources, imagers, cuvettes, as well as many other types of optical elements. The optical element 21 may be of flat uniform thickness, or wedge shaped, or of simple or compound curvature, or of any other geometry and thickness. It is understood that no limit is placed herein on the usage of the described mount.

Figure 4A:
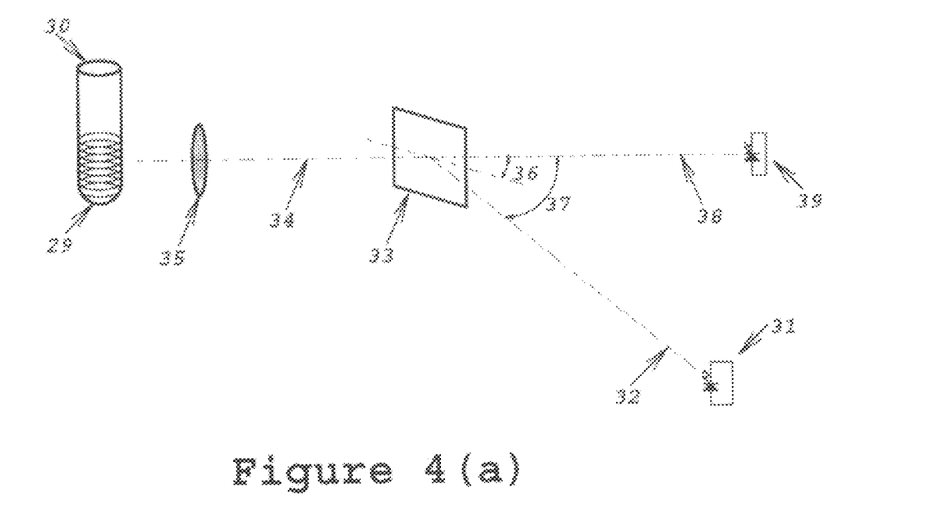
FIG. 4(a) is a schematic view of a laser system employing a beamsplitter.
Figure 4B:
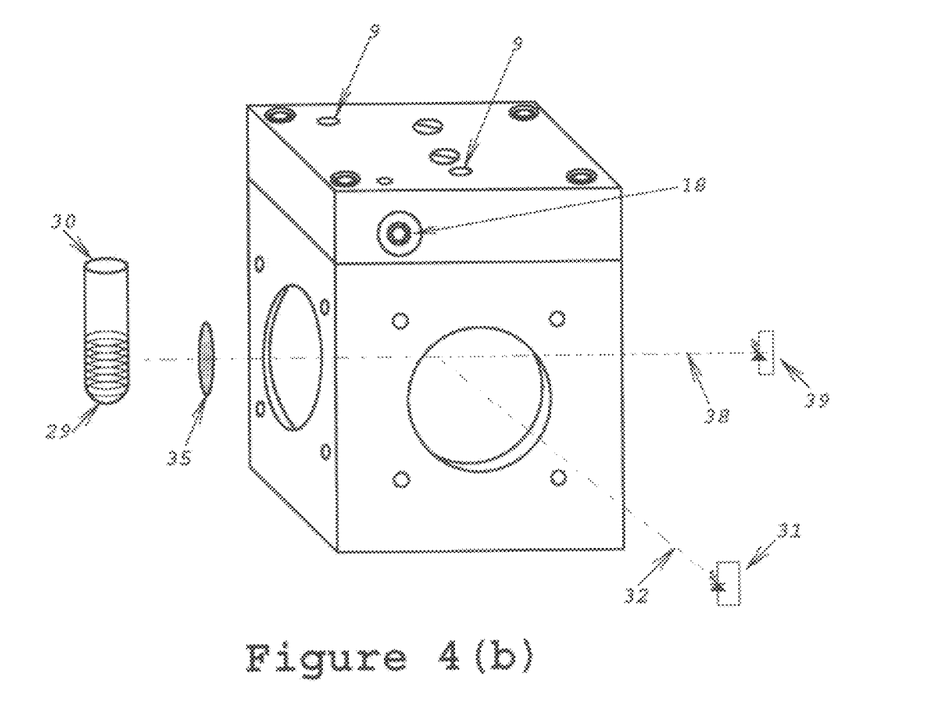
FIG. 4(b) is a modified schematic view of the laser system shown in FIG. 4(a) showing the location of the optical mount for the beamsplitter.

In FIGS. 4(a) and 4(b), an example of one use of the present invention is shown. With reference to FIG. 4(a), there is a liquid test sample 29 contained in a test tube vial or cuvette 30 in which the presence or amount of an analyte of interest is characterized by the concentration of a fluorescent dye molecule. Fluorescein, GFP and Luciferin are examples of such molecules. Optical interrogation of such fluorescence (in simplified form) may be performed by illuminating the sample 29 with an optical source 31 such as a laser or LED, whose emission axis 32 is directed to the front surface of a dichroic beamsplitter 33 from which the beam is reflected along objective axis 34 through an objective lens 35 to be focused on the test sample 29. Fluorescent optical emission of a longer wavelength is collected by the objective lens 35 and directed back along objective axis 34 to the dichroic beamsplitter 33. The dichroic beamsplitter 33 transmits the fluorescent emission without altering its direction; the fluorescence emission travels along the emission axis 38 to the optical detector 39 in which the optical signal is converted to electrical format and signal information is then extracted by further electronic and/or software means.

In order for this optical fluorescence interrogation to function, the dichroic beamsplitter 33 must be mounted and aligned such that the illumination or excitation energy is concentrated on the test sample 29 and the fluorescence emission energy is directed to the optical detector 39. Typical design practice provides that the objective axis 34 and the emission axis 38 be collinear, and that the illumination axis 32 be perpendicular to the objective axis 34. This implies that the illumination axis angle 37 is 90°, and that the dichroic surface angle 36 is 45°.

With reference to FIG. 4(b), the alignment procedure for the dichroic beamsplitter 33 in its mount requires three simple steps: (a) With an alignment mirror inserted in the objective lens 35 mount, the gimbal plate alignment setscrews are adjusted to achieve vertical co-planarity of the optical axes 32, 34 and 38. (b) The phase angle alignment setscrew 18 is then adjusted to center the reflected illumination beam on the optical source 31. (c) The alignment mirror is removed, and the phase angle alignment setscrew 18 is then adjusted for maximum detector signal with a uniform fluorescence reference sample 29 in the test tube or cuvette 30.

Figure 5A:
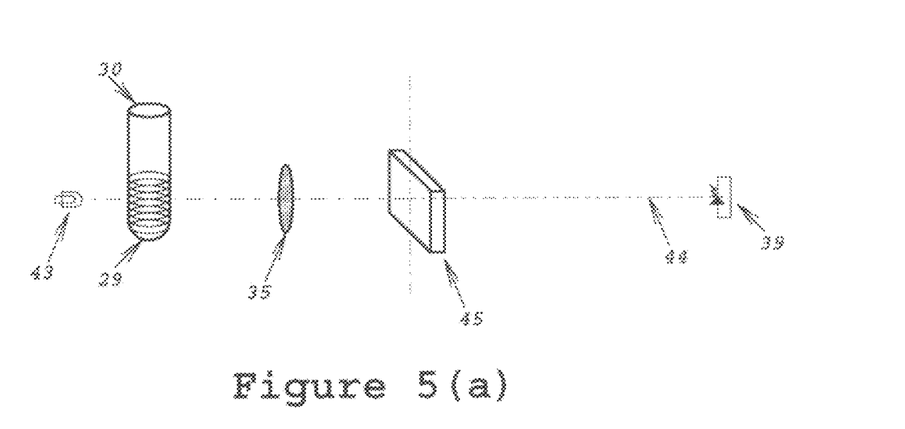
FIG. 5(a) is a schematic view of a laser system employing a polarizing filter.
Figure 5B:
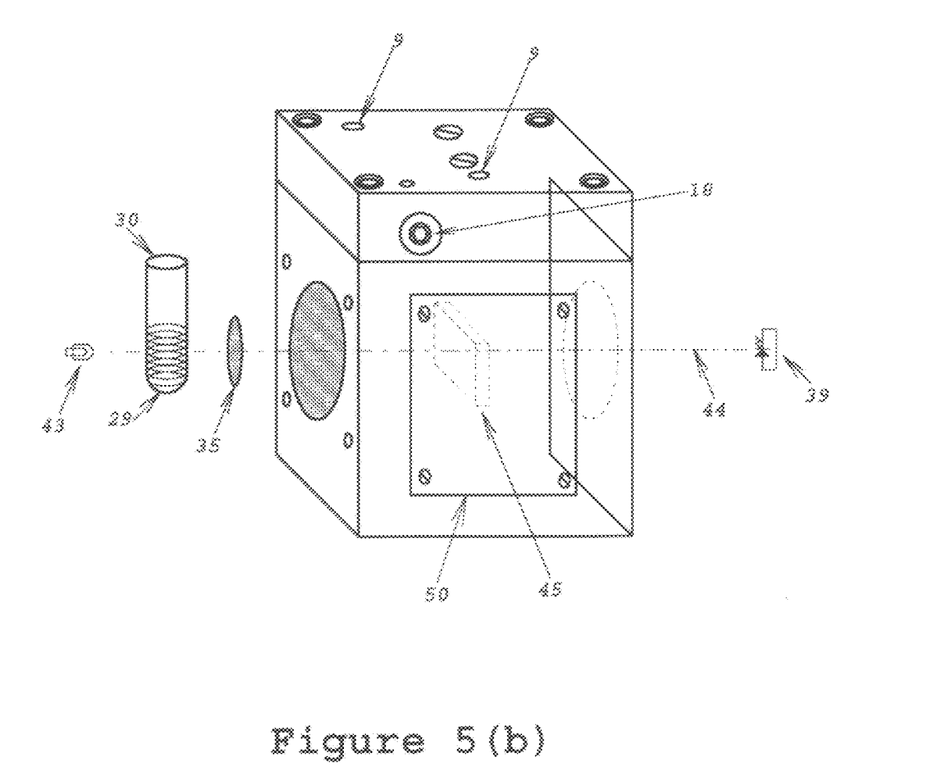
FIG. 5(b) is a modified schematic view of the laser system shown in FIG. 5(a) showing the location of the optical mount for the polarizing filter; and, FIG. 6 is an exploded isometric view of another embodiment of a carrier bracket.

In FIGS. 5(a) and 5(b), a second example of the use of the present invention is shown with the exception that the carrier bracket 4 is mounted to the gimbal plate 3 with its active surface perpendicular to the optical input axis 13 instead of at an acute or oblique angle. This makes it suitable for mounting apertures, lenses, detectors, optical filters, polarizers and similar optics. An example of this is shown in FIG. 5(a) as a measurement of scattered photon migration in a liquid sample 29 contained in a cuvette or sample vial 30. The sample 29 is illuminated by a polarized optical source 43 along a center-line axis 44 passing through one or more lenses 35 and polarizing filter 45 to an optical detector 39. The polarizing axis of the optical source 43 and the polarizing filter 45 must be orthogonal, thereby ensuring that no direct, non-scattered light is detected by the optical detector 39. The signal output from the detector thus contains only information from the scattered cross-polarized light without variable artifacts from direct transmission through the sample 29. Optimal function of the polarizing filter is obtained as shown in FIG. 5(b) by adjusting the gimbal alignment setscrews 9 and phase angle rotation setscrew 18 so that the surface of the polarizing filter 45 is exactly perpendicular to the optical axis 44.

Figure 6:
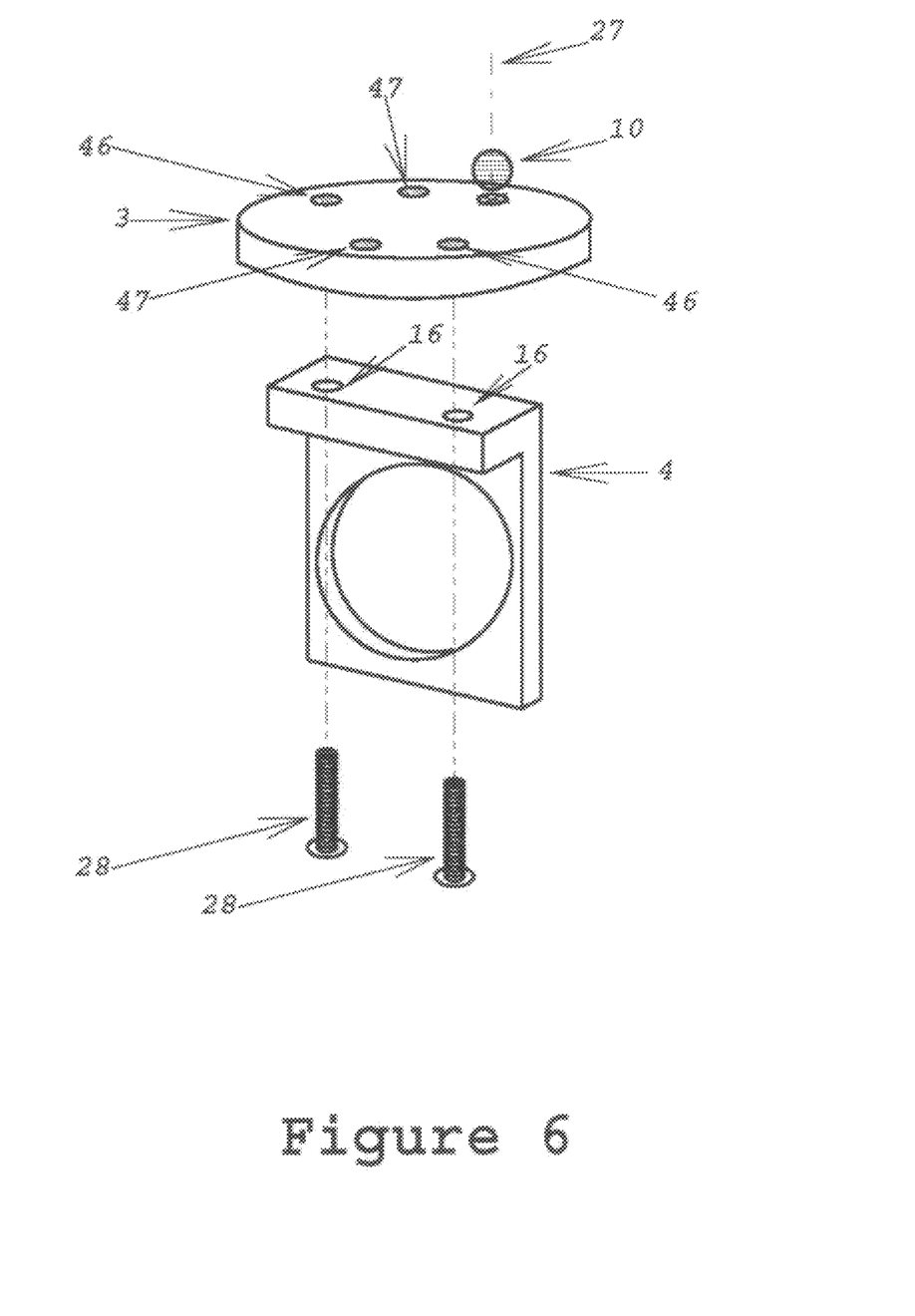

With reference to FIG. 6, the cube mount geometry may be configured as angular (as in the first example) or as linear (as seen in the second example) when assembling the carrier bracket 4 to the gimbal plate 3. The bracket mounting screws 28 are inserted through an array of clearance through-holes 16. For the angular configuration, the screws 28 are inserted in the tapped angular mounting hole array 46, while for the linear configuration the screws 28 are inserted in tapped angular mounting hole array 47. The rotational phase angle difference about the vertical axis (perpendicular to the plane of the gimbal plate 3) between the two configurations in bracket mounting orientation is 45°.

The cube housing 1 provides optical entry and exit via circular ports 49 in three of its vertical side walls. Each circular port may serve as a mount for external attachments or optical system components. Such external system components may be covers such as the cover 50 shown in FIG. 5(*b*), tubes, aperture holders, optical mounts, sensors, light sources, actuators, or any other optical devices, add-ons or cover. External component mounting may be facilitated by the use of mechanical coupling features built into the housing. These coupling features for external components, adapters and brackets mounted on the side walls may be ancillary tapped mounting holes 42 as shown in the drawings, female threads tapped in the annular interior side of circular ports 49 adapted to receive cooperatively threaded components, or standard bayonet, twist-lock, friction or compression fittings, or spring clips, or magnetic mounts. It should be noted that the cube assembly may be readily fitted for light-tight, pressure or vacuum system service by application of suitable gaskets and sealant compound as the cube mount is assembled and aligned.

The cube housing 1 may be removably mounted to a mechanical supporting structure such as an optical table or breadboard by use of a mounting hole array 48 in the housing bottom wall as seen in phantom in FIG. 1 through which bolts or screws may be inserted. This is a set of 5 clearance holes in the bottom surface of the cube housing 1. The mounting hole array 48 is a cross pattern with axes oriented parallel to the orthogonal horizontal edges of the cube housing 1. The pitch of this array is exactly half of the pitch of the optics breadboard or other structure to which it is intended to be mounted. For example, a mount intended for use with a standard ¼-20, 1 inch pitch optical breadboard would be constructed having a mounting hole array 48 of 0.25 inch clearance holes on a 0.5 inch pitch cross pattern. This allows mounting with the optical axes 13 or 14 on incremental centerlines of one-half the breadboard pitch. As an additional feature, a single mounting screw (not shown) used at the central mounting hole of the array 48 enables convenient mounting to the top of a standard optics breadboard post.

It should be noted that the mount may be fixed directly to the optical table, or to an intermediate bolster device which allows elevation of the mount a set distance above the surface of a standard optical plate, or to an intermediate bolster device to provide a change in mounting orientation from horizontal to vertical.

INDUSTRIAL APPLICABILITY

It should be apparent the optical mount described herein is a simple, functional unit that is effective and easily adjustable for a multitude of applications and uses requiring precision.

It should also be apparent that the optical mount described herein allows convenient external adjustment and repositioning of sealed optical elements after the mount has been fixed to the supporting structure.

Other aspects, objects and advantages of this invention can be obtained from a study of the drawings, the disclosure and the appended claims.

It should be understood that the terms "top," "bottom," "first," "second," "upper," "lower," "height," "width," "length," "end," "side," "horizontal," "vertical," and similar terms as used herein, have reference only to the structure shown in the drawings and are utilized only to facilitate describing the invention. The terms and expressions employed herein have been used as terms of description and not of limitation.

From the foregoing, it will be observed that numerous variations and modifications may be effected without departing from the spirit and scope of the invention. It is to be understood that no limitation with respect to the specific apparatus illustrated herein is intended or should be inferred. While specific embodiments of the invention have been disclosed, one of ordinary skill in the art will recognize that one can modify the dimensions and particulars of the embodiments without straying from the inventive concept. It is intended that the appended claims cover all such modifications as fall within the scope of the claims.

What is claimed is:

1. A mount for an optical element to be placed within an optical beam and adapted for use with a supporting structure, said mount comprising:
   a housing adapted to be mounted to the supporting structure and having a top wall providing a supporting base and upright side walls supporting said top wall in spaced relation from the supporting structure and defining an internal space;
   a first opening through one side wall for an incoming beam and a second opening through another side wall for an outgoing beam;
   a movable plate positioned within said housing below said base and connected thereto and carrying retention means for holding an optical element within said internal space intersecting said incoming beam;
   a first mechanism providing a cooperative connection between said base and said plate for adjustably tilting said plate relative to said base; and,
   a second mechanism providing a cooperative connection between said base and said plate for adjustably rotating said plate relative to said base, whereby said plate and the optical element carried thereby is tiltable or rotatable relative to said base to direct an outgoing beam through said second opening along a selected axis by manipulating said first and second adjusting mechanisms.

2. The mount of claim 1 wherein said first mechanism includes means for adjusting the tilt of said plate about two different transverse axes.

3. The mount of claim 2 wherein said first mechanism includes three supports extending from said base and engaging said plate with at least two of said supports including means for adjusting their respective lengths between said base and said plate.

4. The mount of claim 3 wherein one of said supports is a ball carried in respective opposed concave sockets defined in said base and said plate whereby said ball provides a pivot point for said first and second adjustment mechanisms.

5. The mount of claim 3 wherein said second mechanism includes a contact element carried by the plate and a linearly adjustable element carried by said base and engaging said contact element whereby adjusting the length of said adjustable element rotates said plate relative to said base.

6. The mount of claim 5 wherein said linearly adjustable element is a setscrew threaded through a tapped hole in said base.

7. The mount of claim 5 further including a source of force acting to urge said contact element and said linearly adjustable element toward one another.

8. The mount of claim 7 wherein said source of force is a spring carried by said base and engaging said contact element opposite said linearly adjustable element whereby said contact element is resiliently held in contact against said linearly adjustable element.

9. The mount of claim 1 wherein said first mechanism includes three supports extending from said base and engaging said plate with at least one of said supports including means for adjusting its length between said base and said plate.

10. The mount of claim 9 wherein said supports have proximal ends at said base and distal ends contacting the surface of said plate facing said base and further including a source of force acting to urge said plate against said supports.

11. The mount of claim 10 wherein said source of force is a spring acting between said base and said plate to urge said plate against said distal ends whereby said plate is resiliently held in contact with said supports.

12. The mount of claim 11 wherein one of said supports is a ball carried in respective opposed concave sockets defined in said base and said plate whereby said ball provides a pivot point for said first and second adjustment mechanisms.

13. The mount of claim 1 wherein said second mechanism includes a contact element carried by said plate and a linearly adjustable element carried by said base and engaging said contact element whereby adjusting the length of said adjustable element rotates said plate relative to said base.

14. The mount of claim 1 wherein said retention means includes a carrier below and extending from said plate having an opening therethrough along the incoming beam and including a holder for an optical element overlying said carrier opening and spring plungers carried thereby defining a space between said carrier and plungers adapted to receive an optical element with the optical element being held therein by said spring plungers.

15. The mount of claim 14 wherein said carrier is a removable bracket and includes means for securing said bracket to said plate and fasteners extending from one of said bracket and plate and fixed to the other of said bracket and plate to secure said bracket and plate together.

16. The mount of claim 15 wherein said securing means includes an array of holes in said plate, an array of holes in said bracket with at least a portion thereof being arranged to be aligned with at least portion of said plate holes at selected positions of said bracket, and fasteners passing through said bracket holes and fixed in said plate holes.

17. The mount of claim 16 wherein said plate holes are angularly arranged to permit said bracket to be optionally fixed to said plate in a first position with the optical element placed generally perpendicular to the incoming beam or in a second position at a 45° angle transverse thereto.

18. The mount of claim 1 further including means associated with said side walls for mounting an attachment to said housing overlying said side wall openings.

19. The mount of claim 1 wherein said side,walls are flat and configured to define a hollow rectangular housing with at least two of said side walls respectively including said first and second openings, and further including means for mounting an attachment to said housing overlying said side wall openings.

20. The mount of claim 1 further including means associated with said housing for securing said housing to the supporting structure.

21. The mount of claim 20 wherein said housing includes a bottom wall at the lower ends of said side walls adapted to be positioned on the supporting structure and wherein said securing means is an array of holes defined in said bottom wall adapted to receive fasteners inserted through at least one of said holes of said array and secured to the supporting structure.

22. The mount of claim 20 wherein said array holes are angularly arranged along a plurality of axes allowing said housing to be optionally secured to the supporting structure aligned with a first preselected axis or aligned with at least one other preselected axis angularly offset from said first preselected axis.

23. The mount of claim 22 wherein one of said other preselected axes is angularly offset from said first preselected by 45°.

24. The mount of claim 1 further including a third opening in said side walls and wherein one of said second and third side wall openings is along an axis collinear with the axis of the incoming beam and the other of said second and third openings is along a transverse axis angularly offset from said incoming beam axis.

25. The mount of claim 1 wherein said top wall is secured to said housing by releasable fasteners so that said retention means and optical element may be removed from the interior of said housing.

26. A mount for an optical element to be placed within an optical beam and adapted for use with a supporting structure, said mount comprising:
a housing adapted to be mounted to the supporting structure and having a top wall providing a supporting base and upright side walls supporting said top wall in spaced relation from the supporting structure and defining an internal space;
a first opening through one side wall for an incoming beam and a second opening through another side wall for an outgoing beam;
a movable plate positioned within said housing below said base and connected thereto and carrying retention means for holding an optical element within said internal space intersecting said incoming beam;
a first mechanism providing a cooperative connection between said base and said plate for adjustably tilting said plate relative to said base, said first mechanism including three supports extending downward from said base and engaging said plate, said supports having proximal ends at said base and distal ends contacting the surface of said plate base with at least two of said supports including means for adjusting their respective length between said base and said plate, and a source of force acting to urge said plate and said plate toward one another to hold said plate in contact with said supports; and,
a second mechanism providing a cooperative connection between said base and said plate for adjustably rotating said plate relative to said base, said second mechanism including a contact element carried by the plate, a linearly adjustable element carried by said base and engaging said contact element, and a second source of force acting to urge said contact element in contact against said linearly adjustable element whereby said plate and the optical element carried thereby is tiltable or rotatable relative to said base to direct an outgoing beam through said second opening along a selected axis by manipulating said first and second adjusting mechanisms.

27. The mount of claim 26 wherein one of said supports is a ball carried in respective opposed concave sockets defined in said base and said plate, whereby said ball provides a pivot point for said first and second adjustment mechanisms.

28. The mount of claim 26 wherein said retention means includes a carrier below and extending from said plate having an opening therethrough along the incoming beam and including a holder for an optical element overlying said carrier opening and spring plungers carried thereby defining a space between said carrier and plungers adapted to receive an optical element with the optical element being held therein by said spring plungers.

29. The mount of claim 28 wherein said carrier is a removable bracket and includes means for securing said bracket to said plate and fasteners extending from one of said bracket and plate and fixed to the other of said bracket and plate to secure said bracket and plate together.

30. The mount of claim 29 wherein said securing means includes an array of holes in said plate, an array of holes in said bracket with at least a portion thereof being arranged to be aligned with at least portion of said plate holes at selected positions of said bracket, and fasteners passing through said bracket holes and fixed in said plate holes.

31. The mount of claim 30 wherein said plate holes are angularly arranged to permit the bracket to be optionally fixed to said plate in a first position with the optical element placed generally perpendicular to an incoming beam or in a second position at a 45° angle transverse thereto.

32. The mount of claim 26 further including means associated with said side walls for mounting an attachment to said housing overlying said side wall openings.

33. The mount of claim 26 wherein said side walls are flat and configured to define a hollow rectangular housing with at least two of said side walls respectively including said first and second openings, and further including means for mounting an attachment to said housing overlying said side wall openings.

34. The mount of claim 26 further including means associated with said housing for securing said housing to the supporting structure.

35. The mount of claim 34 wherein said housing includes a bottom wall at the lower ends of said side walls adapted to be positioned on the supporting structure and wherein said securing means is an array of holes defined in said bottom wall adapted to receive fasteners inserted through at least one of said holes of said array and secured to the supporting structure.

36. The mount of claim 34 wherein said array holes are angularly arranged along a plurality of axes allowing said housing to be optionally secured to the supporting structure aligned with a first preselected axis or aligned with at least one other preselected axis angularly offset from said first preselected axis.

37. The mount of claim 36 wherein one of said other preselected axes is angularly offset from said first preselected axis by 45°.

38. The mount of claim 26 further including a third opening in said side walls and wherein one of said second and third side wall openings is along an axis collinear with the axis of the incoming beam and the other of said second and third openings is along a transverse axis angularly offset from said incoming beam axis.

39. The mount of claim 26 wherein said top wall is secured to said box by releasable fasteners so that said carrier and optical element may be removed from the housing interior.

40. A mount for an optical element to be placed within a beam and adapted for use with a supporting structure defining a reference plane, said mount comprising:
a hollow box defining a housing adapted to be mounted to the supporting structure and having a top wall removably fixed thereto defining a gimbal base and upright side walls supporting said top wall in spaced relation from the supporting structure;
a first opening through one side wall for an incoming beam and a second opening through another side wall for an outgoing beam;
a movable gimbal plate positioned within said housing below said gimbal base and connected thereto;
a carrier positioned below and fixed to said gimbal plate having an opening therethrough along the incoming beam and including a holder for an optical element overlying said carrier opening;
spring retention means attached to said carrier for retaining the optical element within said holder;
a first mechanism providing a cooperative connection between said gimbal base and said gimbal plate for adjustably tilting the optical element relative to the reference plane, said first mechanism including three supports extending downward from said gimbal base and engaging said gimbal plate, said supports having proximal ends at said gimbal base and distal ends contacting the surface of said gimbal plate facing said gimbal base with at least two of said supports including means for adjusting their respective length between said gimbal base and said gimbal plate, and spring means acting to urge said gimbal plate against said supports to resiliently hold said gimbal plate in contact with said supports; and,
a second mechanism providing a cooperative connection between said gimbal base and said gimbal plate for adjustably rotating the optical element relative to the reference plane, said second mechanism including a contact element carried by the gimbal plate, a linearly adjustable element carried by said gimbal base and engaging said contact element, and spring means carried by said gimbal base and engaging said contact element opposite said linearly adjustable element to resiliently hold said contact element in contact against said linearly adjustable element whereby said gimbal plate and the optical element carried thereby is tiltable or rotatable relative to said gimbal base to direct an outgoing beam through said second opening along a selected axis by manipulating said first and second adjusting mechanisms.

41. The mount of claim 40 wherein one of said supports is a ball carried in respective opposed concave sockets defined in said gimbal base and said gimbal plate, whereby said ball provides a pivot point for said first and second adjustment mechanisms.

42. The mount of claim 40 further including a third opening in said side walls and wherein one of said second and third side wall openings is along an axis collinear with the axis of the incoming beam and the other of said second and third openings is along a transverse axis angularly offset from said incoming beam axis.

43. The mount of claim 40 wherein said top wall is secured to said box by releasable fasteners so that said carrier and optical element may be removed from the housing interior.

* * * * *